(12) United States Patent
Kato et al.

(10) Patent No.: US 6,175,455 B1
(45) Date of Patent: Jan. 16, 2001

(54) REAL-IMAGE FINDER

(75) Inventors: Shigeru Kato, Tachikawa; Masahiro Suzuki, Hachioji, both of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/201,096

(22) Filed: Nov. 30, 1998

(30) Foreign Application Priority Data

Dec. 1, 1997 (JP) .................................................. 9-329834

(51) Int. Cl.[7] .............................. G03B 5/04; G03B 23/00; G03B 17/20; G03B 13/14
(52) U.S. Cl. .......................... 359/837; 359/431; 396/296; 396/377
(58) Field of Search ..................................... 359/431, 640, 359/833, 834, 835, 837, 831; 396/384, 377, 382, 296

(56) References Cited

U.S. PATENT DOCUMENTS

| | | | | |
|---|---|---|---|---|
| 3,149,547 | * | 9/1964 | Jurenz | 396/384 |
| 4,589,749 | * | 5/1986 | Strobel | 354/221 |
| 5,838,504 | * | 11/1998 | Ichikawa et al. | 359/834 |

FOREIGN PATENT DOCUMENTS 2629690    4/1997   (JP) .

* cited by examiner

*Primary Examiner*—Cassandra Spyrou
*Assistant Examiner*—Jared Treas
(74) *Attorney, Agent, or Firm*—Pillsbury Madison & Sutro LLP

(57) ABSTRACT

An indication-within-finder free from ghost light is provided at a minimal cost even in the case of a pentagonal prism or the like. The finder includes an objective system (61) having a positive refracting power, an image-inverting system including a roof prism (62) and a pentagonal prism (63), and an ocular system (64) having a positive refracting power. An object image is formed on an intermediate image plane (65) by the objective system (61) and the roof prism (62). The object image is viewed with the ocular system (64) through the pentagonal prism (63). The position of the intermediate image plane (65) is approximately coincident with the entrance surface of the pentagonal prism (63). A deflecting member (67) projecting in a wedge shape is provided on the entrance surface of the pentagonal prism (63). Light rays (68') passing through the deflecting member (67) are deflected by refracting surfaces (67' and 67"). Therefore, the rays (68') do not reach a viewer's pupil, but blacked-out indications are seen.

15 Claims, 5 Drawing Sheets

REAL-IMAGE FINDER

BACKGROUND OF THE INVENTION

The present invention relates to an indication display device of a finder optical system used in a camera for photography or an electronic camera.

A finder for a camera needs indication display within the field of view to display an indication of a distance measurement range for autofocusing and an indication for parallax correction in photography at the closest focusing distance. Conventionally, a real-image finder is provided with an indication display member near an intermediate image formation plane. Known indication display methods include a method wherein incident light is blocked to display an indication, and a method wherein a wedge-shaped deflecting member is provided on the surface of an optical element of a Porro prism to deflect incident light in a direction in which it does not reach a viewer's pupil, as disclosed in Gazette Containing the Japanese Patent No. 2629690.

However, the method wherein incident light is blocked requires extra processing, e.g. vapor deposition onto a transparent member. This causes an increase in the cost. In the case of the method wherein incident light is deflected, if an indication display member is formed as a molded part, it is unnecessary to subject each individual parts to extra processing, and there is no increase in the cost. However, in the case of a prism in which an entrance surface and an exit surface are disposed close to each other as in a pentagonal prism, for example, deflected rays may be totally reflected by the exit surface to reach the viewer's pupil as light still having a strong intensity, thus causing ghost light. Rays deflected by a deflecting member for indication deviate from a visual field viewing light path but are still directed toward the pupil. In a Porro prism such as that shown in FIG. 1, an entrance surface 11 is surrounded with a first reflecting surface 12 and three diffusing surfaces 13. Therefore, most of deflected rays impinge on the diffusing surfaces 13 to become diffused light of weak intensity. Accordingly, only a slight amount of light reaches the viewer's pupil and is not recognized as ghost light. In the case of a pentagonal prism such as that shown in FIG. 2, light that travels along a normal light path enters the prism through an entrance surface 21 and is successively reflected by reflecting surfaces 23 and 23' to exit from an exit surface 22. However, the exit surface 22 has a mirror surface not included in the normal light path in the neighborhood of the entrance surface 21. Therefore, as shown in part (a) of FIG. 4, deflected rays 40 may be totally reflected by an exit surface 41 (22) and reflected by a first reflecting surface 42 and a second reflecting surface 43 to reach a viewer's pupil without being diffused. In this case, a bright ghost image having a size equivalent to the indication is undesirably observed, giving rise to a problem.

SUMMARY OF THE INVENTION

In view of the above-described problems with the prior art, an object of the present invention is to provide an indication-within-finder made free from ghost light at a minimal cost even in the case of a prism having a mirror surface not included in the normal light path in the neighborhood of an entrance surface thereof as in a pentagonal prism.

To attain the above-described object, the present invention provides a real-image finder including an objective system having a positive power, and an image-inverting system including a prism. The real-image finder further includes an ocular system having a positive power. A deflecting member is placed near an intermediate image plane formed by the objective system to deflect incident light rays with respect to a visual field viewing light path. A prism is placed closer to the ocular system than the intermediate image plane. The prism has a mirror surface not included in a normal light path in the neighborhood of an entrance surface thereof. Light rays deflected by the deflecting member and totally reflected by the mirror surface are blocked or scattered before reaching the ocular system.

It is desirable that the deflected light rays should satisfy the following condition (1):

$$20° < \omega \tag{1}$$

where $\omega$ is an angle formed between the deflected light rays and the mirror surface.

It is more desirable that the deflected light rays should satisfy the following condition (1'):

$$20° < \omega < 50° \tag{1'}$$

It is also desirable that the deflecting member should have a pair of refracting surfaces, and the refracting surfaces should satisfy the following condition (2):

$$\omega' < 40° \tag{2}$$

where $\omega'$ is an angle formed between each of the refracting surfaces and the mirror surface.

It is more desirable that the deflecting member should have a pair of refracting surfaces, and the refracting surfaces should satisfy the following condition (2'):

$$10° < \omega' < 40° \tag{2'}$$

It is also desirable that the deflecting member should have a pair of refracting surfaces, and the refracting surfaces should satisfy the following condition (3):

$$40° < \theta < 100° \tag{3}$$

where $\theta$ is a vertex angle formed between the pair of refracting surfaces.

It is more desirable that the deflecting member should have a pair of refracting surfaces, and the refracting surfaces should satisfy the following condition (3'):

$$50° < \theta < 90° \tag{3'}$$

In addition, the present invention provides a real-image finder including an objective system having a positive power, and an image-inverting system including a prism. The real-image finder further includes an ocular system having a positive power. A deflecting member is placed near an intermediate image plane formed by the objective system to deflect incident light rays with respect to a visual field viewing light path. A prism is placed closer to the ocular system than the intermediate image plane. The prism has a mirror surface not included in a normal light path in the neighborhood of an entrance surface thereof. The deflecting member has a pair of refracting surfaces. A ridge formed between the pair of refracting surfaces is not parallel to the mirror surface.

In addition, the present invention provides a real-image finder including an objective system having a positive power, and an image-inverting system including a prism. The real-image finder further includes an ocular system having a positive power. A deflecting member is placed near an intermediate image plane formed by the objective system to deflect incident light rays with respect to a visual field viewing light path. A prism is placed closer to the ocular system than the intermediate image plane. The prism has a mirror surface not included in a normal light path in the neighborhood of an entrance surface thereof. The deflecting member has a diffusing surface.

It is desirable that the deflecting member should be provided on the entrance surface of the prism.

It is desirable that the prism should be a pentagonal prism.

It is desirable that the prism should be formed by injection molding of a plastic material.

The reasons for adopting the above-described arrangements, together with the functions thereof, will be described below.

If the system is arranged to block or diffuse 80% or more of light rays reflected by the mirror surface, which is not included in the normal light path, after being deflected by the deflecting member, ghost light gives rise to no problem even at a position other than the pupil position assumed in design. The ocular system, which extends from the intermediate image plane to the finder exit part, can be arranged in a compact form by allowing the deflected light rays to impinge at a deep angle on the mirror surface, which is not included in the normal light path. Visual field rays near the intermediate image plane are approximately telecentric, i.e. approximately parallel to the optical axis. Therefore, in the case of a finder with a small-sized ocular system, as shown in FIG. 5, if the angle ω formed between a mirror surface 51 and a light ray 50 deflected by a deflecting member 54 is small, the ray 50 is totally reflected by the mirror surface 50 and then passes through an ocular system 52 to reach a viewer's pupil with a strong intensity without being blocked. Conversely, if the angle ω formed between a deflected ray 53 and the mirror surface 51 is large, it becomes more likely that the ray 53 will not satisfy the condition for total reflection at the mirror surface 51. Even if the ray 53 is totally reflected, there is a strong probability that the reflected ray 53 will be blocked before passing through the ocular system 52. For the reasons stated above, it is preferable for the deflected light rays to satisfy the following condition.

$$20°<\omega \tag{1}$$

where ω is an angle formed between the deflected light rays and the mirror surface.

If the angle ω is not larger than the lower limit of the condition (1), the amount of deflection is excessively small, and it becomes more likely that ghost light will occur.

There is also a likelihood that deflected light rays will pass through the mirror surface instead of being reflected thereby and exit from the ocular lens as stray light. Therefore, it is even more desirable that the deflected light rays should satisfy the following condition (1'):

$$20°<\omega<50° \tag{1'}$$

In a case where the deflecting member is, as shown in FIG. 3, a refracting member 31, e.g. a small prism, if the angle formed between each refracting surface 32 and a mirror surface 33 is large [see part (a) of FIG. 3], the amount of deflection is small. Consequently, a deflected light ray 34 impinges on the mirror surface 33 at a shallow angle unfavorably. Accordingly, it becomes more likely that ghost light will occur as shown in part (a) of FIG. 4. Conversely, if the angle formed between each refracting surface 32 of the refracting member 31 and the mirror surface 33 is small [see part (b) of FIG. 3], the amount of deflection is large, and the deflected light ray 34 impinges on the mirror surface 33 at a deep angle. Accordingly, the possibility of ghost light occurring reduces as shown in part (b) of FIG. 4. For the reasons stated above, it is preferable that the refracting member serving as a deflecting member should satisfy the following condition (2):

$$\omega'<40° \tag{2}$$

where ω' is an angle formed between each refracting surface and the mirror surface.

If the angle ω' is not smaller than the upper limit of the condition (2), the amount of deflection is excessively small, and it becomes more likely that ghost light will occur.

There is also a likelihood that deflected light rays will pass through the mirror surface instead of being reflected thereby and exit from the ocular lens as stray light. Therefore, it is even more desirable that the refracting member serving as a deflecting member should satisfy the following condition (2'):

$$10°<\omega'<40° \tag{2'}$$

In addition, it is preferable that the refracting member serving as a deflecting member should satisfy the following condition (3):

$$40°<\theta<100° \tag{3}$$

where θ is a vertex angle formed between the pair of refracting surfaces.

If the angle θ is not larger than the lower limit of the condition (3), as shown in part (c) of FIG. 3, incident light 34 deflected by one refracting surface 32' of a pair of refracting surfaces 32' and 32" may be totally reflected by the other refracting surface 32" and thus deflected again, remaining as a light ray 44 of shallow angle as shown in part (c) of FIG. 4. If the angle θ is not smaller than the upper limit of the condition (3), there may be light rays that undesirably enter the ocular system directly without being satisfactorily refracted by the refracting member 31. Consequently, displayed indications cannot be completely blackened. Thus, it becomes impossible to perform the intended indication display.

In a case where the prism is formed by injection molding of a plastic material, it is preferable that the refracting member serving as a deflecting member should satisfy the following condition (3'):

$$50°<\theta<90° \tag{3'}$$

If the angle θ is not larger than the lower limit of the condition (3'), the refracting member 31 becomes excessively thin. Consequently, it becomes difficult to charge the plastic material, and moldability degrades. If the angle θ is not smaller than the upper limit of the condition (3'), there may be light rays that enter the ocular system without being satisfactorily refracted by the refracting member 31.

Even in the case of a prism having a mirror surface not included in the normal light path in the neighborhood of an entrance surface thereof, if a ridge formed between a pair of refracting surfaces that constitute a refracting member serving as a deflecting member is not parallel to the mirror surface, no light rays are deflected toward the mirror surface. Therefore no ghost light occurs.

Furthermore, if deflected light rays are diffused by the deflecting member itself, even if light rays reach the viewer's pupil, the light intensity is weak, and ghost light is inconspicuous. In a case where the refracting surfaces are mirror surfaces, even if the deflecting member is arranged as stated above, it is still likely that stray light due to light, exclusive of visual field light, e.g. light internally reflected by the objective lens frame, will reach the viewer's pupil as ghost light. However, if the refracting surfaces are formed in the shape of diffusing surfaces, it is possible to reduce the quantity of stray light undesirably reaching the viewer's pupil.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the real-image finder according to the present invention will be described below.

Figure 1:
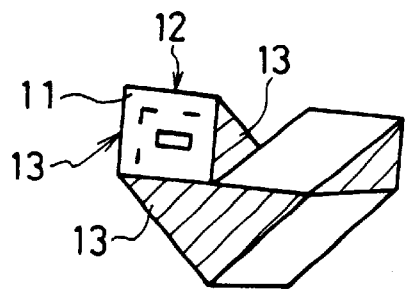
FIG. 1 is a perspective view showing a conventional Porro prism.
Figure 2:
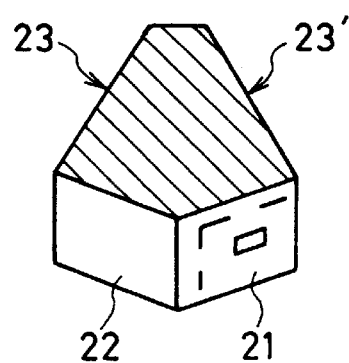
FIG. 2 is a perspective view showing a conventional pentagonal prism.
Figure 3A:
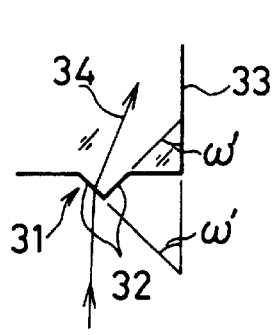
FIG. 3 is a diagram illustrating the deflection of light rays by a refracting member serving as a deflecting member.
Figure 3B:
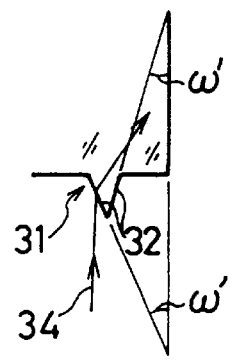
Figure 3C:
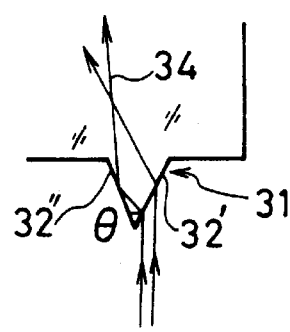
Figure 4A:
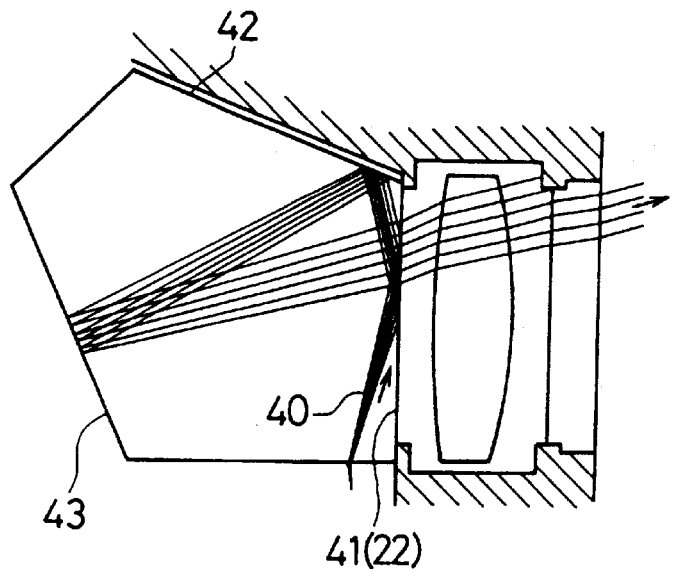
FIG. 4 is a diagram showing the way in which ghost light occurs depending upon the deflection angle of light rays.
Figure 4B:
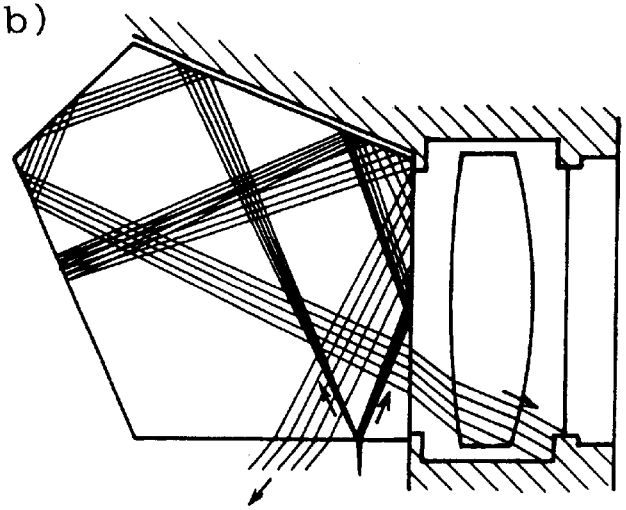
Figure 4C:
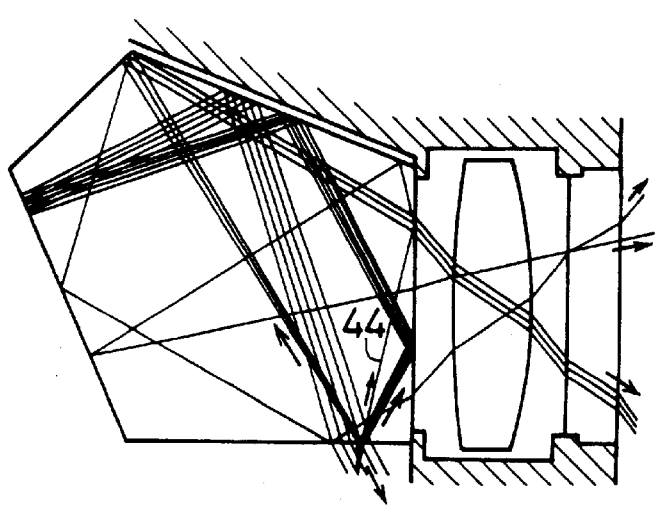
Figure 5:
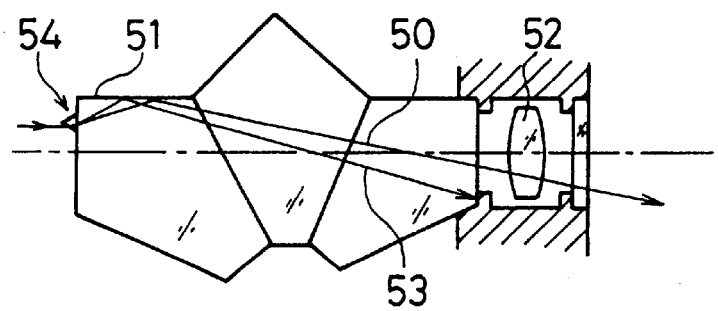
FIG. 5 is a development of a pentagonal prism.
Figure 6A:
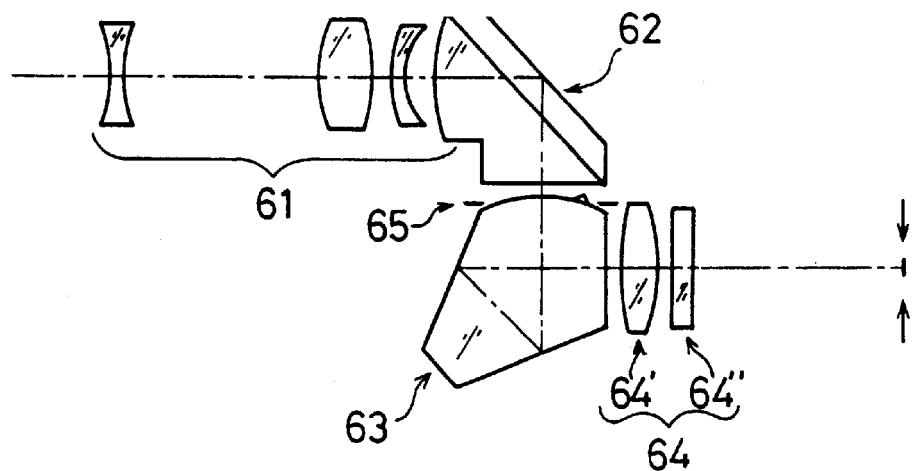
FIG. 6 is a diagram showing a real-image finder according to a first embodiment of the present invention.
Figure 6B:
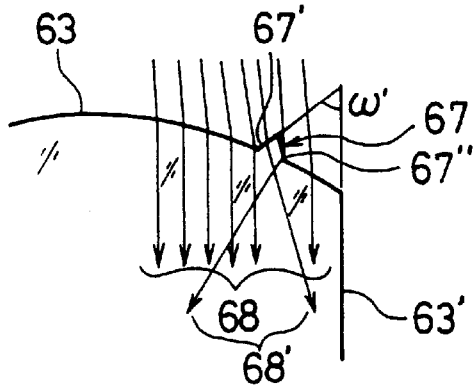
Figure 6C:
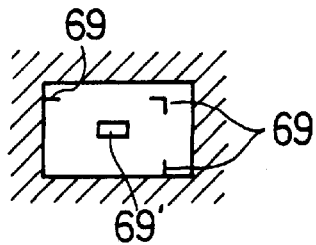

As shown in part (a) of FIG. 6, a real-image finder according to a first embodiment of the present invention includes, in order from an object side thereof, an objective system 61 having a positive refracting power, an image-inverting system including a roof prism 62 and a pentagonal prism 63, and an ocular system 64 having a positive refracting power. The ocular system 64 includes an ocular lens 64' and an ocular window 64". An object image is formed on an intermediate image plane 65 by the objective system 61 and the roof prism 62. The object image is viewed with the ocular system 64 through the pentagonal prism 63. The pentagonal prism 63 has an entrance surface that is convex toward the object side. The position of the intermediate image plane 65 is approximately coincident with the entrance surface of the pentagonal prism 63. As shown in part (b) of FIG. 6, which is a sectional view, a deflecting member 67 projecting in a wedge shape is provided on the entrance surface of the pentagonal prism 63 to display an indication for parallax correction and an indication of an AF distance measurement range. The deflecting member 67 has a linear configuration extending in a direction normal to the plane of the figure. Light rays 68 that do not pass through the deflecting member 67 reach a viewer's pupil as visual field viewing light. Light rays 68' that pass through the deflecting member 67 are deflected by refracting surfaces 67' and 67" and therefore do not reach the viewer's pupil. Accordingly, the viewer sees blacked-out indications as shown in part (c) of FIG. 6. Reference numeral 69 denotes a parallax correction indication. Reference numeral 69' denotes an indication of an AF distance measurement range. In this case, there is a possibility that the rays 68' may impinge directly on an exit surface 63' and be totally reflected thereby to reach the viewer's pupil as ghost light. In this embodiment, however, the angle ω' between the refracting surface 67' of the deflecting member 67 and the exit surface 63' is set to satisfy the above-described condition (2). Therefore, the totally reflected rays are blocked in the vicinity of the ocular lens 64' and do not reach the viewer's pupil. Accordingly, ghost light is unlikely to occur.

Figure 7A:
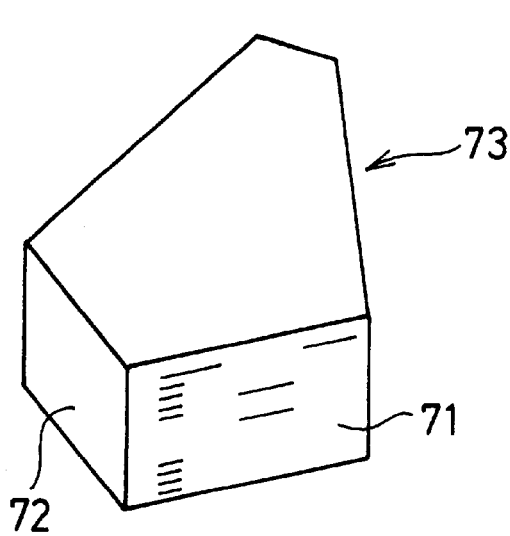
FIG. 7 is a diagram showing a deflecting member in a second embodiment of the present invention.
Figure 7B:
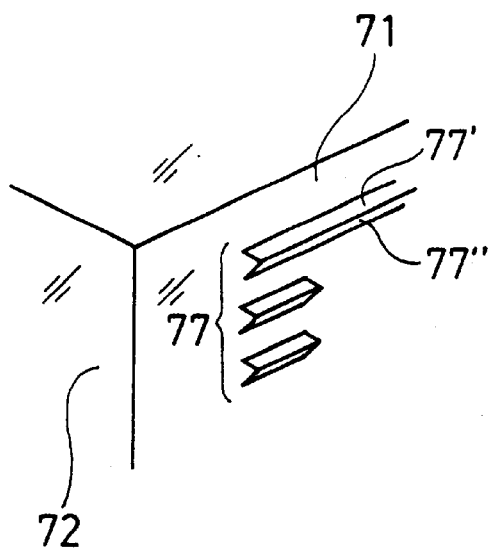
Figure 7C:
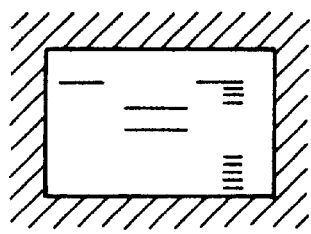

A real-image finder according to a second embodiment of the present invention is similar to the first embodiment in the arrangement of a part thereof that extends from the objective system to the ocular system. The second embodiment differs from the first embodiment in that a pentagonal prism is arranged as shown in parts (a) and (b) of FIG. 7. More specifically, a pentagonal prism 73 in this embodiment has deflecting members 77 provided on an entrance surface 71. Each deflecting member 77 projects in a wedge shape. Each deflecting member 77 has a pair of refracting surfaces 77' and 77". A ridge formed between the refracting surfaces 77' and 77" is not parallel to an exit surface 72. That is, the refracting surfaces 77' and 77" are in a skew relation to the exit surface 72. Therefore, no rays are deflected toward the exit surface 72, and hence no ghost light occurs. With the real-image finder according to this embodiment, indications are seen as shown in part (c) of FIG. 7.

Figure 8:
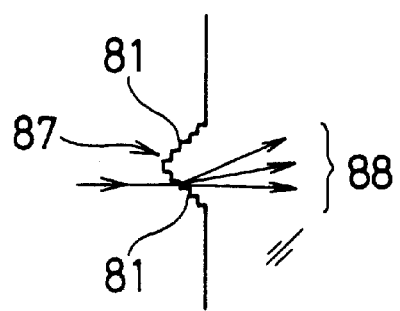
FIG. 8 is a diagram showing a deflecting member in a third embodiment of the present invention.

A real-image finder according to a third embodiment of the present invention is similar to the first embodiment in the arrangement of a part thereof that extends from the objective system to the ocular system. The third embodiment differs from the first embodiment in that a deflecting member is arranged as shown in FIG. 8. More specifically, a deflecting member 87 in this embodiment has refracting surfaces formed from diffusing surfaces 81. The deflecting member 87 has a linear configuration extending in a direction normal to the plane of the figure. Consequently, deflected light rays 88 are diffused by the diffusing surfaces 81. Therefore, even if the rays 88 reach the viewer's pupil, the light intensity is weak, and ghost light is inconspicuous. In this case, if the prism is a molded part, it is only necessary for the surface of a molding die to have diffusing surfaces. Accordingly, no extra processing is required, and there is no increase in the cost.

Figure 9:
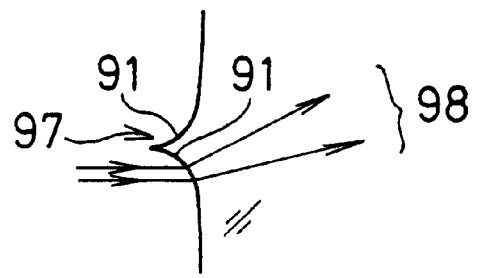
FIG. 9 is a diagram showing a deflecting member in a fourth embodiment of the present invention.

A real-image finder according to a fourth embodiment of the present invention is similar to the first embodiment in the arrangement of a part thereof that extends from the objective system to the ocular system. The fourth embodiment differs from the first embodiment in that a deflecting member is arranged as shown in FIG. 9. More specifically, a deflecting member 97 in this embodiment has refracting surfaces formed from curved surfaces 91. The deflecting member 97 has a linear configuration extending in a direction normal to the plane of the figure. Consequently, deflected light rays 98 become diffused light. Therefore, advantageous effects similar to those in the third embodiment are obtained.

Figure 10A:
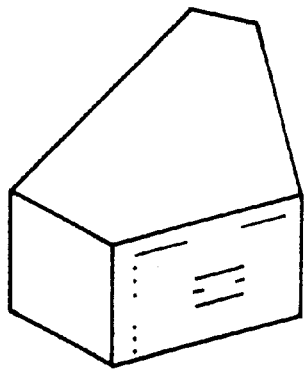
FIG. 10 is a diagram showing a deflecting member in a fifth embodiment of the present invention.
Figure 10B:
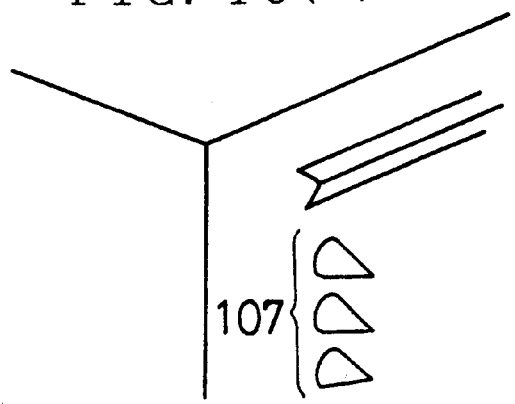
Figure 10C:
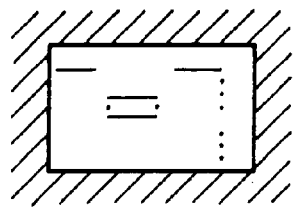

A real-image finder according to a fifth embodiment of the present invention is similar to the first embodiment in the arrangement of the portion that extends from the objective system to the ocular system. The fifth embodiment differs from the first embodiment in that deflecting members are arranged as shown in FIG. 10. More specifically, deflecting members 107 in this embodiment have refracting surfaces each formed from a conical surface. Consequently, deflected light rays become diffused light. Therefore, advantageous effects similar to those in the third embodiment are obtained.

As will be clear from the foregoing description, it is possible according to the present invention to provide an indication-within-finder made free from ghost light at a minimal cost even in the case of a prism having a mirror surface not included in the normal light path in the neighborhood of an entrance surface thereof as in a pentagonal prism.

What we claim is:

1. A real-image finder, comprising:
    an objective system having a positive power;
    an image-inverting system including a prism;
    an ocular system having a positive power;
    a deflecting member disposed near an intermediate image plane formed by said objective system to deflect incident light rays with respect to a visual field viewing light path; and
    a prism placed closer to said ocular system than said intermediate image plane, said prism having a mirror surface not included in a normal light path in a neighborhood of an entrance surface thereof,
    wherein light rays deflected by said deflecting member and totally reflected by said mirror surface do not reach said ocular system, thereby displaying a blacked-out indication within said finder.

2. A real-image finder according to claim 1, wherein said mirror surface is an exit surface from which said visual field viewing light path exits, and said light rays deflected by said deflecting member satisfy the following condition (1):

$$20° < \omega \quad (1)$$

where $\omega$ is an angle formed between said light rays deflected by said deflecting member and said mirror surface.

3. A real-image finder according to claim 1, wherein said light rays deflected by said deflecting member satisfy the following condition (1'):

$$20° < \omega < 50° \quad (1')$$

where $\omega$ is an angle formed between said light rays deflected by said deflecting member and said mirror surface.

4. A real-image finder according to claim 1, wherein said deflecting member has a pair of refracting surfaces, said refracting surfaces satisfying the following condition (2):

$$\omega' < 40° \quad (2)$$

where $\omega'$ is an angle formed between each of said refracting surfaces and said mirror surface.

5. A real-image finder according to claim 1, wherein said deflecting member has a pair of refracting surfaces, said refracting surfaces satisfying the following condition (2'):

$$10° < \omega' < 40° \quad (2')$$

where $\omega'$ is an angle formed between each of said refracting surfaces and said mirror surface.

6. A real-image finder according to claim 1, wherein said deflecting member has a pair of refracting surfaces, said refracting surfaces satisfying the following condition (3):

$$40° < \theta < 100° \quad (3)$$

where $\theta$ is a vertex angle formed between said pair of refracting surfaces.

7. A real-image finder according to claim 1, wherein said deflecting member has a pair of refracting surfaces, said refracting surfaces satisfying the following condition (3'):

$$50° < \theta < 90° \quad (3')$$

where $\theta$ is a vertex angle formed between said pair of refracting surfaces.

8. A real-image finder, comprising;
    an objective system having a positive power;
    an image-inverting system including a prism;
    an ocular system having a positive power;
    a deflecting member disposed near an intermediate image plane formed by said objective system to deflect incident light rays with respect to a visual field viewing light path, thereby displaying a blacked-out indication within said finder; and
    a prism placed closer to said ocular system than said intermediate image plane, said prism having a mirror surface not included in normal light path in a neighborhood of an entrance surface thereof,
    wherein said deflecting member has a pair of refracting surfaces, and a ridge formed between said pair of refracting surfaces is not parallel to said mirror surface.

9. A real-image finder, comprising:
    an objective system having a positive power;
    an image-inverting system including a prism;
    an ocular system having a positive power;
    a deflecting member disposed near an intermediate image plane formed by said objective system to deflect incident light rays with respect to a visual field viewing light path, thereby displaying a blacked-out indication within said finder; and
    a prism placed closer to said ocular system than said intermediate image plane, said prism having a mirror surface not included in a normal light path in a neighborhood of an entrance surface thereof,
    wherein said deflecting member has a diffusing surface.

10. A real-image finder according to any of claims 1 to 9, wherein said deflecting member is provided on the entrance surface of said prism.

11. A real-image finder according to claim 10, wherein said prism is a pentagonal prism.

12. A real-image finder according to claim 10, wherein said prism is formed by injection molding of a plastic material.

13. A real-image finder according to any of claims 1 to 9, wherein said prism is a pentagonal prism.

14. A real-image finder according to claim 11, wherein said prism is formed by injection molding of a plastic material.

15. A real-image finder according to any of claims 1 to 9, wherein said prism is formed by injection molding of a plastic material.

* * * * *